Figure 3:
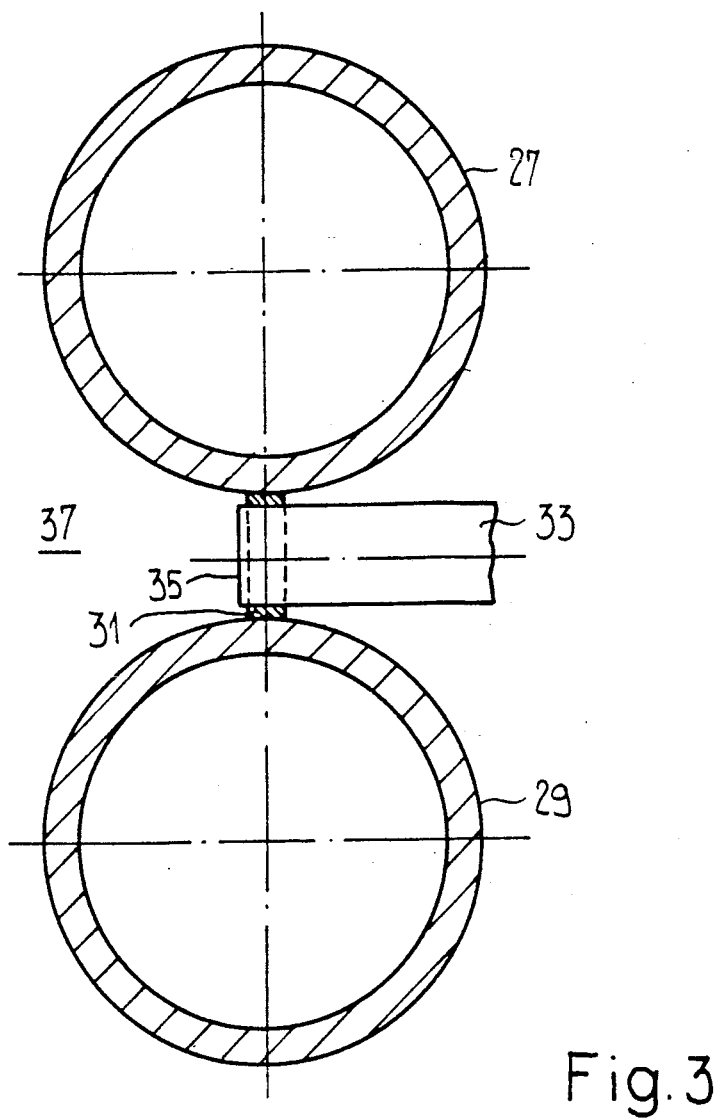

United States Patent [19]

Rüegg et al.

[11] Patent Number: 5,045,292
[45] Date of Patent: Sep. 3, 1991

[54] PROCESS FOR THE REMOVAL OF NITRIC OXIDES FROM FLUE GASES

[75] Inventors: Hans Rüegg, Wohlen; René Vock, Bonstetten, both of Switzerland

[73] Assignee: Von Roll AG, Gerlafingen, Switzerland

[21] Appl. No.: 630,411

[22] Filed: Dec. 19, 1990

Related U.S. Application Data

[63] Continuation of Ser. No. 412,798, Sep. 26, 1989, abandoned.

[30] Foreign Application Priority Data

Sep. 27, 1988 [CH] Switzerland .................. 03578/88

[51] Int. Cl.$^5$ .................. C01B 21/00; B01J 8/00
[52] U.S. Cl. .................. 423/235; 423/239
[58] Field of Search .................. 423/235, 235 D, 239, 423/239 A

[56] References Cited

U.S. PATENT DOCUMENTS

| | | | |
|---|---|---|---|
| 1,964,942 | 7/1934 | Hallgarth | 261/76 |
| 4,181,705 | 1/1980 | Gumerman | 423/235 |
| 4,780,289 | 10/1988 | Epperly et al. | 423/235 |
| 4,842,834 | 6/1989 | Burton | 423/235 |

FOREIGN PATENT DOCUMENTS

| | | |
|---|---|---|
| 0236686 | 9/1987 | European Pat. Off. . |
| 3407689 | 9/1985 | Fed. Rep. of Germany . |
| 1177722 | 4/1959 | France . |
| 2379026 | 8/1978 | France . |
| 8907004 | 8/1989 | PCT Int'l Appl. . |

*Primary Examiner*—Gregory A. Heller
*Attorney, Agent, or Firm*—Michael N. Meller

[57] ABSTRACT

Nitric oxides are removed from flue gases by the spraying-in of a liquid containing a reducing agent. The atomizing agent necessary for forming the liquid into individual droplets and for the transportation of the droplets is introduced together into the central feed pipe for the liquid before it is branched to the individual spray points.

5 Claims, 2 Drawing Sheets

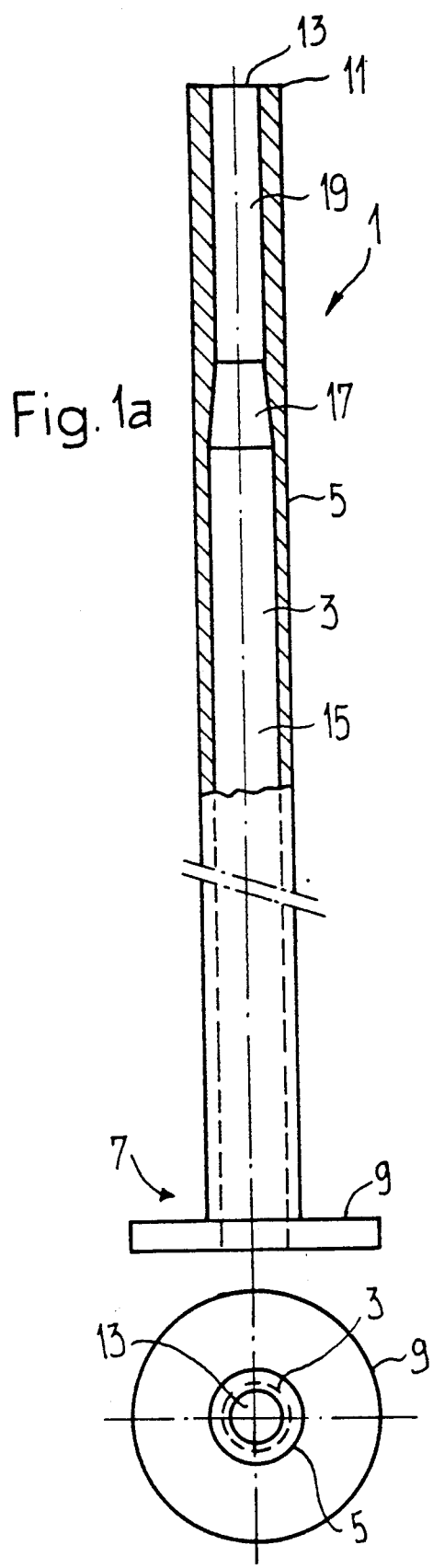
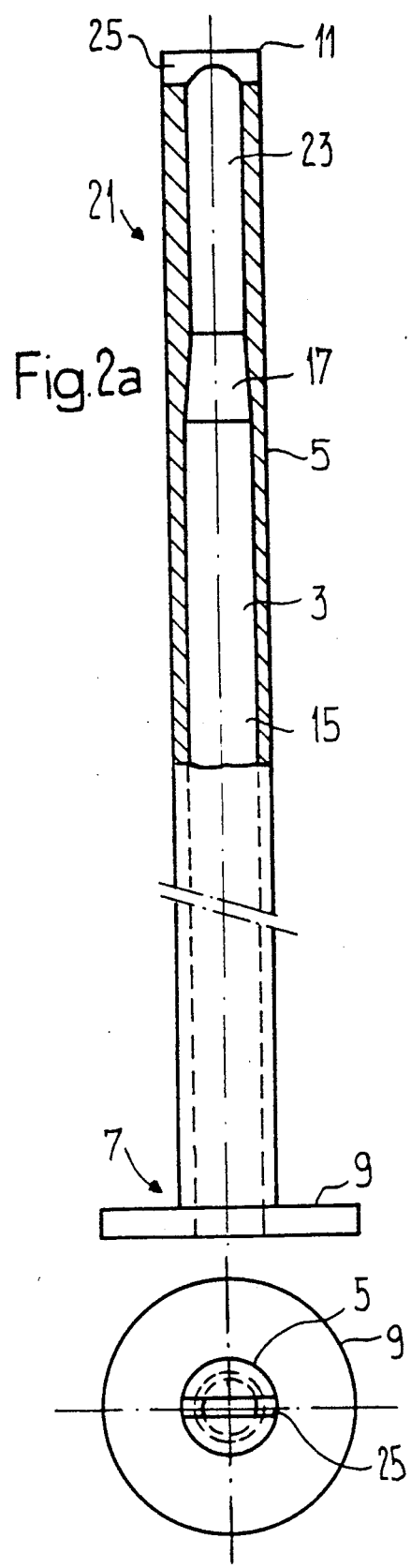

PROCESS FOR THE REMOVAL OF NITRIC OXIDES FROM FLUE GASES

This application is a continuation of application Ser. No. 412,798, filed Sept. 26, 1989, now abandoned.

The invention relates to a process for the spraying of a liquid into the boiler part of an incineration plant. In particular, the invention relates to a process for the removal of nitric oxides from the flue gases produced in incineration.

Nitric oxides are produced in the incineration of fossil fuels, domestic garbage, industrial wastes etc. For reasons of environmental protection, they cannot be discharged freely into the atmosphere.

Various processes are already known, for example from U.S. Pat. No. 3,900,554 and U.S. Pat. No. 4,507,269, in which nitric oxides in flue gases are reduced to nitrogen by spraying in an ammonia solution or other suitable reducing agent, in the presence of the oxygen existing in any case in the flue gases.

The spraying-in or jetting-in of ammonia or of another suitable solution at some location or other of an incineration plant is carried out in accordance with the prior art, with so-called two-substance nozzles, i.e., with nozzles in which the atomizing agent is mixed with the liquid directly before spraying. Two-substance nozzles guarantee a uniform distribution and a uniform depth of penetration of the droplets. They are used in series. In this case, each individual nozzle requires its own liquid feed and atomizing agent feed with corresponding control devices. Therefore, the procedure is very complex. In addition, two-substance nozzles have relatively large dimensions, which hinders the installation into an incineration plant. In particular, the equipping of already existing incineration plants with such nozzles, in order to adapt the plant to new environmental protection requirements, is extremely difficult, sometimes impossible. These difficulties are pointed out in U.S. Pat. No. 4,507,269.

With the two-substance nozzles, in which an atomizing agent and the liquid are mixed directly before spraying, and although very fine droplets can be achieved by using large quantities of propellant, the jet penetration depth of the droplets necessary for an adequate reaction of several meters into a boiler part is not guaranteed. In particular, the quantity of atomizing agent necessary for the achievement of a great depth of penetration makes the process uneconomical.

An object of the invention is to provide a process for the spraying of a liquid into the boiler part of an incineration plant which is accomplished with nozzles having a smaller space requirement than the known two-substance nozzles.

The boiler part refers to that region of an incineration plant in which the flue gases leaving the flame are cooled by a cooled wall, e.g., by a pipe through which coolant flows or by another known device. Consequently, a temperature gradient with falling value in the flow direction of the flue gases always prevails in the boiler part. The boiler part may continuously adjoin the combustion space, or form its own space which is connected to the combustion space by one or more lines.

The present invention provides a process for the spraying of a liquid into the boiler part of an incineration plant using a gaseous pressurized atomizing agent, wherein the atomizing agent is introduced into the central feed pipe for the liquid before the branching of the latter to the individual spray points.

It has been found, surprisingly, that the atomizing agent does not have to be added to the liquid to be sprayed directly before spraying, i.e., it is possible to manage without two-substance nozzles if the atomizing agent is priorly added to the liquid to be sprayed in the central feed pipe. Consequently, according to the invention, a mixture of atomizing agent and liquid is already transported in a part of the central feed pipe. After the branching of the central feed pipe, this mixture then passes into smaller pipes. The latter lead to the spray points and are designed at their ends as single-substance nozzles, for example, conically. Consequently, according to the invention, simple pipes may serve as spray points instead of the complicated two-substance nozzles. Since these pipes have relatively small dimensions, they can be installed at all desired locations, including in already existing boilers. They can, for example, be inserted between plates in each case joining two cooling tubes, so-called fins, without the cooling tubes having to be laboriously bent out.

It is unexpected that, by simple addition of the atomizing agent effecting droplet formation and droplet transport to the total quantity, i.e., to the not yet distributed liquid, even better results are achieved in the boiler part than with the use of complex two-substance nozzles. By the procedure according to the invention and the consequent use of single-substance nozzles, coarser individual droplets are sprayed. In this case, a liquid is generally sprayed in transversely to the direction of flow of the flue gases. Since the liquid sprayed in coarser droplets has a significantly smaller specific surface than the fine droplets from the two-substance nozzles, there is also a smaller specific air resistance. As a result, a smaller quantity of atomizing agent is required for a certain depth of penetration than for the fine droplets. Correspondingly, a greater depth of penetration of the droplets into the boiler part can be achieved by the process according to the invention with the same quantity of propellant. The depth of penetration of the droplets into the boiler space is also increased by the fact that a larger droplet needs longer until complete evaporation and consequently has a greater lifetime and residence time.

Due to the larger volume of the individual droplets, the risk of overheating and the associated chemical change in the reducing agent, for example the combustion of the ammonia into nitric oxide, is also avoided, so that the process according to the invention has a greater temperature tolerance, in particular at the upper temperature limit, than the previously known processes. Therefore, the jetting-in locations may be arranged further forward in the boiler part, where higher temperatures prevail. Temperatures of 700°-1100° C., preferably 850°-950° C., are considered as the optimum temperature range for chemical conversion with ammonia although these temperatures are not critical and higher or lower temperatures may be used.

Apart from the lower spraying agent requirement, the process according to the invention also requires a lower outlay on apparatus since, apart from the complex two-substance nozzles, it also dispenses with their feed lines to the corresponding control members.

The apparatus for carrying out the process according to the invention has the following features: a central feed pipe for the liquid to be sprayed, branching to the individual spray points, and a line for the gaseous pressurized atomizing agent, wherein the line for the atomizing agent opens into the central feed pipe for the liquid and the individual spray points are designed as single-substance nozzles.

In this apparatus, conventional pipes, lines, shut-off devices and controls are used. The single-substance nozzles are essentially pipes with especially shaped end regions. The end regions of the pipes may be conically tapered, so that a round jet is sprayed. They may also be designed as slit-shaped fan nozzles. The same apparatus may have both round-jet nozzles and also fan nozzles. Preferably, the round-jet nozzles are arranged alternately with the fan nozzles.

Between the central feed pipe, which carries a relatively large quantity of liquid, and the individual spray points there may be several branchings. In addition, shut-off devices may be provided which are designed to be operated individually or in groups, for example, on individual levels. As a result, allowance can be made for the different temperatures in the boiler part, for example when changing the material to be incinerated or the incineration conditions, by choice of the spray points.

Commercially available ammonia solution, for example, containing 25% ammonia is generally used for the process according to the invention. Other substances which develop ammonia at boiler temperatures may also be used, for example, various known ammonium salts, such as ammonium carbonate, ammonium formate, ammonium oxalate or urea.

Compressed air or compressed steam is used as the atomizing agent which effects the creation and the transportation of the individual droplets. It is possible, for example, to operate with compressed steam in the range of about 3.5-4 bar and with compressed air in the range of about 6 bar.

After carrying out the process according to the invention, the steam created can be condensed and the liquid collected, which may still contain unconverted reducing agent, can be further processed according to known processes or recycled in the incineration plant.

The following figures and examples serve to illustrate the invention. The figures show purely schematically:

FIG. 1a: This is a side view of a single-substance nozzle for carrying out the process according to the invention, in partially sectional representation.

FIG. 1b: A plan view of the single-substance nozzle according to FIG. 1a.

FIG. 2a: A side view of a further single-substance nozzle for carrying out the process according to the invention, partially in sectional representation.

FIG. 2b: A plan view of the single-substance nozzle according to FIG. 2a.

FIG. 3: An arrangement of a single-substance nozzle in the boiler part of an incineration plant.

The same elements in the Figures are denoted by the same reference numerals.

The single-substance nozzle 1 in FIGS. 1a and 1b, designed as a round-jet nozzle, has a pipe 5 provided with an axial bore 3, at the inlet-side end 7 of which pipe a flange 9 is arranged and at the outlet-side end 11 of which a round outlet opening 13 is formed for the liquid jet being discharged into the boiler part. The axial bore 3 has three regions: following the flange 9, a first, lengthy cylindrical region 15, an adjoining short region 17, narrowing conically in the direction of flow, and, adjoining that, a second cylindrical region 19. The latter is shorter than the first cylindrical region 15 and longer than the conical region 17. The flange 9 adjoins a feed pipe (not shown).

In operation, the mixture of liquid and atomizing agent entering the single-substance nozzle 1 through the feed pipe passes through the first cylindrical region 15, is accelerated in the short conical region 17 and, after passing through the second cylindrical region 19, is discharged as a round jet consisting of many individual droplets from the round outlet opening 13 into the boiler part (not shown).

The single-substance nozzle 21 in FIGS. 2a and 2b, designed as a fan nozzle, likewise has a pipe 5, provided with an axial bore 3, and a flange 9. The first two regions 15 and 17 of the bore 3 coincide with those in FIGS. 1a and 1b. The third region, i.e., the second cylindrical region, is designed as a blind bore 23. The single-substance nozzle 21 ends in a gap-shaped outlet opening 25, through which the liquid enters the boiler part in a fan-shaped jet consisting of many individual droplets.

Round-jet nozzles and fan nozzles may be arranged in any combination, preferably alternately. It goes without saying that other nozzle shapes apart from the two shown are suitable for the process according to the invention.

In FIG. 3, two boiler pipes 27, 29, through which a cooling medium flows and which are connected to each other by a metal plate 31, which is also referred to as a fin, are shown. The metal plate 31 is penetrated by a single-substance nozzle 33, the outlet opening 35 of which protrudes into the interior 37 (not shown any further) of the boiler part. By the use according to the invention of single-substance nozzles, already existing incineration plants can also be operated in an ecologically safe way, since the single-substance nozzles can be installed without any problems in the narrow space between the boiler pipes.

Both the individual process parameters and the design of the apparatus involved can be varied by a person skilled in the art within the scope of his know-how. In particular, preparation of the ammonia solution for the process according to the invention can be left until within the plant, by introducing ammonia into the water or an aqueous solution.

In the examples represented below in the form of a table, the process according to the invention is used for the removal of nitric oxides ($NO_x$) from the flue gas which has been produced in the incineration of domestic garbage.

The jetting-in or the spraying-in has taken place into the combustion chamber in the so-called first pass. The spraying-in can, of course, also take place at another location.

| Example | Units | 1 | 2 | 3 |
|---|---|---|---|---|
| Flue gas stream | *Bm³/h | 280000 | 280000 | 250000 |
| Flue gas temperature in the jetting-in zone | °C. | 900 | 950 | 850 |
| Combustion chamber dimensions | m · m | 5.0 · 4.8 | 5.0 · 4.8 | 5.0 · 4.8 |
| Quantity of atomizing agent | kg/h | 800 | 800 | 800 |
| Mass flow of the NH₃ solution | kg/h | 100 | 50 | 200 |
| Volumetric flow through a nozzle | *Bm³/h | 36 | 36 | 40 |
| Nozzle outlet velocity | m/s | 110 | 110 | 120 |
| Concentration of | % | 25 | 25 | 15 |

-continued

| Example | Units | 1 | 2 | 3 |
|---|---|---|---|---|
| the NH₃ solution NO$_x$ concentration before the reduction zone | mg/m³ | 380 | 410 | 390 |
| NO$_x$ concentration after the reduction zone | mg/m³ | 68 | 205 | 51 |

*Bm³ = operating or actual cubic meters per hour

We claim:

1. A process for the removal of nitric oxides from flue gases produced during incineration, by the spraying of a liquid containing at least one reducing agent into a boiler part of an incineration plant by means of a gaseous pressurized atomizing agent, wherein the atomizing agent is introduced into a central feed pipe for the liquid before a branching of the feed pipe to the individual spray points and the liquid is sprayed into the boiler part transversely to the direction of the flue gases at temperatures of from 700°–1100° C.

2. A process according to claim 1, wherein an ammonia solution, a solution of a compound giving off ammonia, or a mixture thereof is sprayed in at boiler temperature.

3. A method according to claim 2, wherein compressed air or compressed steam is used as an atomizing agent.

4. A method according to claim 3, wherein the location of the spraying-in within the boiler part is controlled in accordance with the temperature profile existing there.

5. A process according to claim 1 wherein the spray temperature is from 850° to 950° C.

* * * * *